March 6, 1951     A. FROSCH     2,543,843
MAGNETIC FIELD MEASURING DEVICE
Filed July 8, 1948
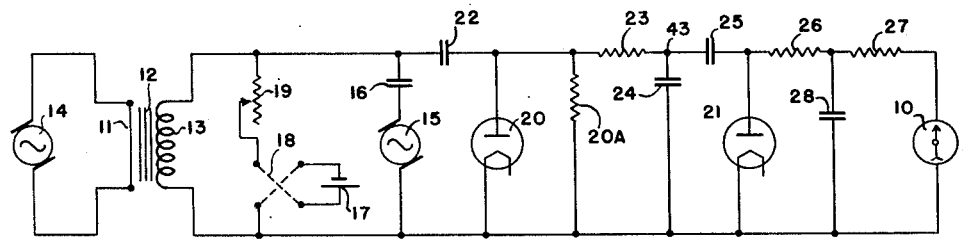
—FIG. 3.—
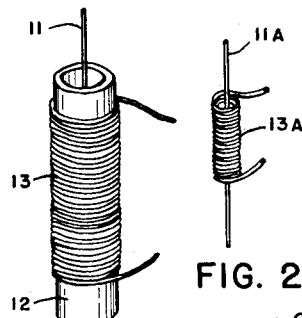
FIG. 2.
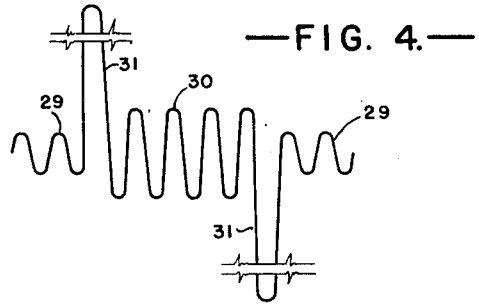
—FIG. 4.—
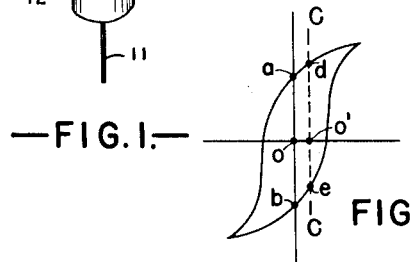
—FIG. 1.—
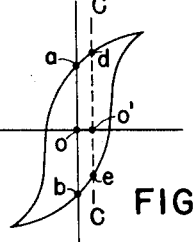
FIG. 6.
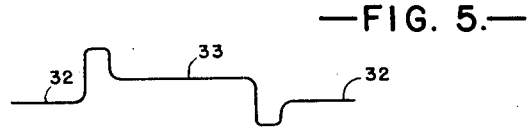
—FIG. 5.—
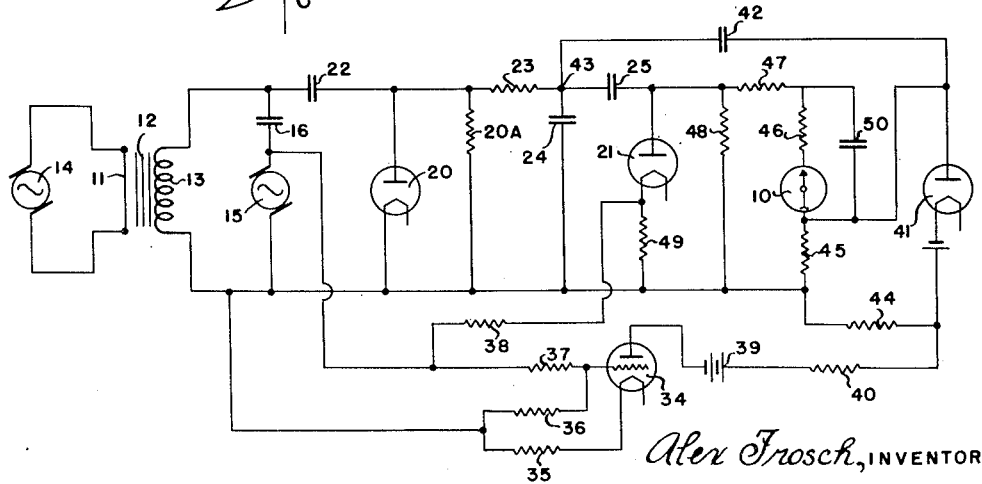
—FIG. 7.—
Alex Frosch, INVENTOR.
BY Earl Babcock ATTORNEY.

Patented Mar. 6, 1951

2,543,843

UNITED STATES PATENT OFFICE 2,543,843

MAGNETIC FIELD MEASURING DEVICE

Alex Frosch, Houston, Tex., assignor, by mesne assignments, to Standard Oil Development Company, Elizabeth, N. J., a corporation of Delaware Application July 8, 1948, Serial No. 37,590

4 Claims. (Cl. 175—183)

This invention relates to magnetometers or instruments for making measurements of the strength of magnetic fields and more particularly to instruments for recording the magnitude of changes in the strength of the earth's magnetic field.

In magnetometers heretofore devised for measuring the earth's magnetic field, it has commonly been the practice to provide a coil of copper wire which is rotated to induce an electrical current therein due to the cutting of the earth's magnetic field. The coil has to be specially mounted for rotation and the instrument is not very rugged.

In accordance with the present invention it is proposed to provide a better magnetometer and one which operates upon a different principle. The essential element is a small cylinder of iron, either in the form or a rod or a tube, which is adapted to become magnetized when placed in the earth's magnetic field. If desired, the small iron cylinder may be moved across the earth's magnetic field as by means of an airplane. A determination of changes in the earth's magnetic properties can be made by observing changes in magnetism of the cylinder. On the other hand, the small cylinder may be held stationary and the changes in the earth's magnetic field at the point where it is located determined from time to time.

Accordingly, it is the primary object of the invention to devise an improved detector for the measurement of magnetic fields which employs a comparatively simple instrument of robust construction capable of giving accurate indications.

It is a further object of the invention to devise a magnetometer which operates entirely independently of the speed of movement through the magnetic field and yet does not employ any rotating parts.

It is still another object of the invention to devise a novel circuit arrangement for eliminating or reducing the effects of hysteresis in a magnetometer employing a cylinder of magnetic material as a detector.

Other objects and advantages reside in certain novel features of the system as will become more apparent from a consideration of the following description taken in connection with the accompanying drawings, in which Fig. 1 is a view in perspective of a magnetic field detector constructed in accordance with the present invention;

Fig. 2 is a view in perspective of a modified form of detector;

Fig. 3 is a circuit diagram of an electrical system, in which the detector of Fig. 1 is incorporated, illustrating how measurements may be made with it;

Fig. 4 is a diagram illustrating variations in the amplitude of an electrical wave in a portion of the apparatus of Fig. 3 and illustrating how the effects of hysteresis in the detector of Fig. 1 may be eliminated;

Fig. 5 is a diagram illustrating variations in voltage in another portion of the circuit of Fig. 3 and illustrating the nature of the pulses fed to the measuring device in Fig. 3;

Fig. 6 is a typical hysteresis diagram in which magnetic force is plotted as abscissae and retentivity as ordinates.

Fig. 7 is a circuit diagram of another embodiment of the invention utilizing the detector of Fig. 1.

The present invention is based upon the following principles:

1. A bar of iron, especially one of elongated cylindrical form, such as a rod or tube may be used as a magnetometer. It becomes a magnet if placed in parallel with the lines of force of a magnetic field and, until the bar becomes saturated, the strength of its magnetism is some function of the strength of the field.

2. If a bar of iron is used as a magnetometer, some means must be provided for determining the strength of its magnetism. One way of measuring magnetism in such a bar of iron is to use it as the core of a transformer. Other factors remaining constant, the voltage in the secondary of a transformer will vary with changes in the magnetism of its iron core.

3. Some arrangement must also be provided to overcome hysteresis effects if a bar of iron is to be of practical value as a magnetometer in a changing field. If the bar is periodically magnetically saturated, first in one direction and then in the other, the effects of hysteresis can be eliminated or minimized if the readings of magnetism are taken in a definite sequence with respect to the saturating steps.

Referring to the drawing in detail and first to Figs. 1 and 2, it will be seen that two transformers or magnetic detectors are there illustrated. In Fig. 1, the detector consists of a small vertical wire designated 11 which passes along the axis of a tube 12 around which a coil of insulated wire 13 is wound. The wire 11 may be copper, the tube 12 may be made of ferro-magnetic material, such as iron alloy and the coil 13 of insulated copper wire. In Fig. 2, the central wire 11A itself is made of iron or other ferro-magnetic material with an insulated coil 13A surrounding it.

The tube 12 of Fig. 1 should be preferably quite small, say two inches long and one-eighth inch in diameter with the wall extremely thin, say in the neighborhood of one-thousandth of an inch. If the conductor 11A of Fig. 2 is employed as the magnetic material, it may be of a few inches long and a few thousandths of an inch in diameter. In either case, it will be seen that a cylindrical magnetic body is provided in which the diameter is very small compared with the length.

For convenience in explanation it will be assumed that the embodiment of the detector shown in Fig. 1 is the one employed in the circuit illustrated in Fig. 3 and Fig. 7. That is, it will be assumed that the central wire 11 is of copper and the tube or cylinder 12 is of magnetic material.

In the arrangement of Fig. 3 the transformer or detector shown in Fig. 1 is incorporated between a source of alternating current 14 and a suitable measuring system which includes a meter 10. The source 14 serves to energize the transformer. The output voltage of the transformer is that due to this energization but it is subject to variations caused by the magnetic field in which the transformer is located. Of course, the meter 10 may be merely an indicating galvanometer or it may be of the recording type. Any known construction may be employed such as a vacuum tube voltmeter. The detector of Fig. 1 is incorporated in the system of Fig. 3 by connecting the conductor 11 to the source 14. The magnetic cylinder 12 then acts as the core of a transformer with the conductor 11 the primary and the coil 13 the secondary. This arrangement thus constitutes a transformer in which the core is a variable depending upon the magnetic field in which it is located and the amount of transformation from the primary 11 to the secondary 13 depends upon changes in the nature of the core 12.

In addition to the source 14 connected to the primary of the magnetic detector, the circuit of Fig. 3 includes a second source of alternating current designated 15 which impresses a voltage across the secondary 13 of the transformer. The source 15 is of a lower frequency than the source 14. It is a square wave source and it is in series with a condenser 16 which transmits only the time derivative. Hence, only sharp alternating pulses are impressed on the secondary of the transformer. The pulses magnetize the core periodically in spaced half cycles first to saturation in one direction and then to saturation in the other direction, thereby causing the flux in the core to pass through its hysteresis loop in time spaced half cycles, as shown in Fig. 4 and described hereinafter. The time constant of the condenser 16 and coil 13 combination is small so that only transients at the beginning and end of each square-wave cycle are passed to the coil. The peak value of current in the secondary due to a pulse is sufficient to saturate the core. The pulse then quickly dies away and the core remains magnetized for a period of time with the corresponding polarity subject only to the influence of the external field and the field produced by the central wire until another pulse occurs. The succeeding pulse is of opposite polarity and saturates the core, after which it remains magnetized with opposite polarity for another period. The purpose of the additional source 15 is to remove hysteresis effects as will be described hereinafter.

The circuit of Fig. 3 may or may not include as an additional element a source of direct current 17. If included, it may be connected through a reversing switch 18 and a resistor 19 across the secondary 13 of the transformer.

The measuring circuit of Fig. 3 includes two diodes which act as half wave rectifiers and which are designated 20 and 21, respectively. These are connected between the secondary 13 of the transformer and the meter 10, and the circuit includes resistors 20A, 23, 26 and 27 as well as condensers 22, 24, 25 and 28 as illustrated. Of course the frequency characteristics of the various elements of the circuits are designed to correspond to the frequencies of the signals. An additional stage or several stages of amplification may be incorporated in advance of the condenser 22 and in advance of the condenser 25 but these are not shown, being only conventional. The condenser 25 blocks out any direct current from the first diode 20 circuit and prevents it from passing into the second diode 21 circuit. The resistors 26 and 27 together with the condenser 28 constitute a filter arrangement which smooths the output of the diode 21. The chart of Fig. 4 represents the voltage existing across the coil 13 of the circuit of Fig. 2 during one complete cycle over the hysteresis loop of Fig. 6 with the system subjected to a constant magnetic field. It will be seen that this chart (Fig. 4) contains waves of three different amplitudes. Those illustrated at 29 and 30 are of a frequency which is the second harmonic of the source 14 when the magnetic detector or transformer 11—12—13 is in a weak external magnetic field. Were the detector not subjected to any external magnetic field, the amplitude of waves 29 and 30 would be the same. That is, waves 29 would be slightly higher and waves 30 slightly smaller than illustrated in Fig. 4. Where subjected to an external field, there is a difference between the output voltages of the transformer before and after each half cycle of flux change over the hysteresis loop caused by the source 15. Thus in Fig. 4, the waves designated 30 are of a greater amplitude than those shown at 29 and the difference between the amplitude of waves 29 and 30 is the quantity to be measured since it is caused by and is a function of the strength of the external field in which the detector is located as will be explained in connection with the diagram of Fig. 6. The waves 31 represent pulses impressed upon the circuit by the source 15 through the condenser 16. It will be seen that the rate of occurrence of the waves 31 is low compared with that of waves 29 and 30. Waves 31 are impressed upon the circuit for the purpose of removing the effects of hysteresis of the core 12 upon the measurements. As explained above, they cause the core 12 to be magnetized to saturation alternately in one direction and then in another.

The diagram in Fig. 5 represents the wave form which appears across condenser 24 of the system of Fig. 3 as the result of rectification of the wave form of Fig. 4 by the diode 20. Hence the voltages 32 and 33 are proportional to the amplitudes of the waves 29 and 30 of Fig. 4 and the difference in magnitude between the voltages 32 and 33 is proportional to the difference in amplitude between the waves 29 and 30 of Fig. 4 and hence is a function to the strength of the magnetic field in which the detector is located.

It is this difference which is measured by the meter 10. This is accomplished as follows:

The wave form of Fig. 4 is impressed upon the condenser 22 and the diode 20 and rectified. The rectified voltage appears across resistor 20A and ripple voltages are removed by a low pass filter consisting of resistor 23 and condenser 24. What remains across condenser 24 is the wave form of Fig. 5, which includes direct current. The direct current is blocked by condenser 25 which transmits the A. C. components of the signal of Fig. 5 to the diode 21. Rectification again occurs which produces an indication on the meter 10 of the differences between the voltages 32 and 33 of Fig. 5. Since only half-wave rectification is involved, this voltage varies in the same manner as the voltage difference between 32 and 33, which would be obtained with full wave rectification. The narrow peak and valley due to the pulses produce a small but constant effect which can be neglected. The condenser 28 and the resistor 27 act as a filter to remove ripple voltages from the circuit of the meter 10.

Fig. 3 also includes the battery 17, as mentioned above, the purpose of which is to place a direct current bias on the secondary 13 of the transformer 11—12—13 if desired. The bias may be placed on this transformer in either direction and may be used if desired to shift the point of operation of the detector to a more optimum position on its hysteresis curve.

Fig. 6 is a typical hysteresis diagram of a piece of iron. In it, variations in field strength are plotted as abscissae and magnetic induction as ordinates. If the iron core 12 is magnetically saturated first in one direction and then in the other, its magnetic induction traverses a loop like that illustrated. If the core 12 is used to measure an unknown magnetic field, some way must be provided for taking into account these hysteresis effects. In the first place, the magnetization curve is not linear relative to the magnetic field, and in the second place, due to the magnetic retentivity of all iron the measurements of the strength of the magnet depend upon the strength and direction of the field to which the iron has previously been subjected as well as the strength of the field attempted to be measured at one particular instant.

In accordance with the present invention, both of these causes of error are minimized.

In Fig. 6, the hysteresis curve is shown as symmetrical about its axes and the distance o—a equals the distance o—b. This represents the condition when the core 12 of Fig. 1 is not subjected to any external magnetic field. There is as much magnetic induction in one direction as in the other. If the detector is not subjected to any external field, the amplitude of waves 29 of Fig. 4 equal the amplitude of waves 30. If subjected to an unknown field, the points on this hysteresis curve which are selected by the system for measurements shift either to the right or to the left. This shift is represented by the dashed line C—C of Fig. 6. This means that the magnetic induction represented by the distance o'—d is greater than that represented by the distance o'—e. The system is such that the voltage of waves 29 of Fig. 4 (and hence the voltage 32 of Fig. 5) is a function of the induction represented by the distance o'—e in Fig. 6, while the voltage of the waves 30 (and voltage 33 of Fig. 5) is a function of the induction represented by the distance o'—d. The system of Fig. 3 measures the difference between the voltages 32 and 33 and hence is indicative of the magnitude of the shift represented by the dashed line C—C and hence measures the strength of the unknown field.

In Fig. 3 current which causes the deflection of meter 10 is unidirectional. Hence the meter 10 does not indicate on which side of the hysteresis loop the unknown external field appears. In other words it does not indicate whether the line C—C of Fig. 6 is to the right or left of the vertical axis. The arrangement of Fig. 7 enables the meter to indicate this direction.

In the arrangement of Fig. 7 the parts which correspond to those of Fig. 3 are similarly designated. As in Fig. 3, stages of amplification (not shown) may be inserted.

The circuit of Fig. 7 differs from that of Fig. 3 in the employment of a phase inverter for switching the control signal. The phase inverter includes a triode 34 and suitable resistors 35, 36, 37 and 38. The grid of the triode is connected through the resistor 37 to one terminal of the source 15, while the cathode of the triode 34 is connected through the resistor 35 to the other terminal of the source 15. The plate circuit of the triode is connected through B-battery 39 and resistor 40 to the cathode of a diode 41 the plate of which is connected through a condenser 42 to the terminal 43 between the resistor 23 and condenser 25 of the measuring circuit or signal circuit of the diode 21. Resistors 44, 45, 46, 47, 48 and 49 and a condenser 50 are incorporated in the circuit of Fig. 7 as illustrated. The operation of the circuit of Fig. 7 is identical with that of Fig. 3 up to the terminal designated 43 in each.

The voltage at terminal 43 in Fig. 7 acts on both diodes 21 and 41. Each of the diodes are alternately blocked by applying square wave voltages to their cathodes through the resistors 38 and 40 from the square wave generator 15. The voltage applied through the resistor 38 has the same phase as the output of the generator 15 while the voltage applied through resistor 40 is 180 degrees out of phase with the output of generator 15.

As a result of this alternate blocking action, the voltages of condensers 25 and 42 indicate the voltages 32 and 33 of Fig. 5, respectively.

The difference in voltage between these condensers produces a flow of current through the resistors 47 and 48 as well as through resistor 46 the meter 10 and the resistor 45, the direction of which is determined by which charge is the greater. The condenser 50 and resistor 46 serve as ripple filter.

It will be seen from the above description that the invention revolves around the use of a transformer of a particular construction and a measuring system particularly designed for such use. The transformer is one in which an elongated magnetizable core is employed as the detector of a magnetometer. The construction is such that the primary sets up transverse flux in the core. Since as normally used, the core will be placed in the unknown field with its axis parallel with the field, this induced flux is also transverse to the unknown field. To set up this transverse flux, the primary may of course consist of several wires instead of the single one shown at 11 in Fig. 1, or the primary and the core may be the same element, for example, the single iron wire shown at 11A in Fig. 2. It is important however that the primary and the core be substantially co-axial, and it is also important that the secondary of the transformer be substantially co-axial with the primary and the core.

As described above, the core may be made of iron. However, other magnetizable material may be used as will be readily apparent to those skilled in the art.

This application is a continuation-in-part of the application Serial No. 728,344, filed February 13, 1947, for "Magnetic Field Measuring Device," now abandoned.

While only two embodiments of the invention have been shown herein, it is obvious that various changes may be made without departing from the spirit of the invention or the scope of the annexed claims.

I claim:

1. In a magnetometer, a transformer having an elongated straight core of magnetizable material with a co-axial secondary coil thereon, a first source of alternating current connected to said transformer to set up flux in said core transverse to its longitudinal axis, a second source of alternating current connected to said secondary coil for causing the flux in said core periodically to pass completely through its hysteresis loop and a measuring circuit connected to said secondary coil responsive to differences in output voltage of said transformer during the passages of flux in said core through its hysteresis loop.

2. In a magnetometer, a transformer having a single straight wire as a primary, a coil wound co-axially with the straight wire as a secondary and an elongated straight hollow core of magnetizable material mounted co-axially with said straight wire, a first source of energizing alternating current connected to said straight wire to set up flux in said core transverse to the axis of said core, a second source of alternating current of a lower frequency than said first source, connected to said coil for magnetizing said core periodically to saturation alternately in one direction and then in the other direction thereby causing the flux therein to pass completely through its hysteresis loop and a measuring circuit connected to said coil responsive to the difference in the output voltage of said transformer when the core of the same is subjected to an external magnetic field and that caused by said first source when the transformer is not subjected to an external magnetic field.

3. In a magnetometer, a transformer having a wire of magnetizable material serving as a primary and also as an elongated core and a coil wound co-axially with the wire and serving as a secondary, a first source of energizing alternating current connected to said wire to set up flux in the same transverse to the axis thereof, a second source of alternating current of a lower frequency than the first source connected to said coil for magnetizing said wire periodically to saturation alternately in one direction and then in the other direction thereby causing the flux therein to pass completely through its hysteresis loop and a measuring circuit connected to said coil responsive to the difference in the output voltage of said transformer when the core of the same is subjected to an external magnetic field and that caused by said first source when the transformer is not subjected to an external magnetic field.

4. In a magnetometer, a transformer having an elongated core of magnetizable material with a co-axial secondary coil thereon, a first source of alternating current connected to said transformer to set up flux in said core transverse to its axis, a second source of alternating current of a lower frequency than said first source connected to said secondary coil for magnetizing said core periodically in spaced half cycles first to saturation in one direction and then to saturation in the other direction thereby causing the flux therein to pass through its hysteresis loop in time spaced half cycles and a measuring circuit connected to said secondary coil responsive to the difference between the output voltages of said transformer before and after each half cycle of flux change over the hysteresis loop, thereby obtaining an indication of the magnitude of magnetic induction caused by an external magnetic field.

ALEX FROSCH.

REFERENCES CITED

The following references are of record in the file of this patent:

UNITED STATES PATENTS

| Number | Name | Date |
|---|---|---|
| 687,141 | Everest | Nov. 19, 1901 |
| 2,334,593 | Wyckoff | Nov. 16, 1943 |
| 2,406,870 | Vacquier | Sept. 3, 1946 |
| 2,427,666 | Felch et al. | Sept. 23, 1947 |
| 2,446,939 | MacCallum | Aug. 10, 1948 |

FOREIGN PATENTS

| Number | Country | Date |
|---|---|---|
| 699,880 | France | Dec. 17, 1930 |